US008286770B2

(12) United States Patent
Scheck et al.

(10) Patent No.: US 8,286,770 B2
(45) Date of Patent: Oct. 16, 2012

(54) DRIVE DEVICE WITH OVERRIDE FUNCTION

(75) Inventors: Georg Scheck, Weitramsdorf (DE); Robert Neundorf, Ebersdorf (DE); Michael Jacob, Meura (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 1204 days.

(21) Appl. No.: 11/927,561

(22) Filed: Oct. 29, 2007

(65) Prior Publication Data

US 2008/0098656 A1 May 1, 2008

(30) Foreign Application Priority Data

Oct. 31, 2006 (DE) ......................... 10 2006 052 200

(51) Int. Cl.
*F16D 67/02* (2006.01)

(52) U.S. Cl. ................................... 192/17 D; 192/223.4

(58) Field of Classification Search ............... 192/223.4, 192/223, 223.1, 12 BA, 17 D, 81 C
See application file for complete search history.

(56) References Cited

U.S. PATENT DOCUMENTS

| | | | | |
|---|---|---|---|---|
| 1,687,238 | A * | 10/1928 | Costello | 192/223.4 |
| 2,285,027 | A * | 6/1942 | Gates | 192/223.4 |
| 5,806,246 | A | 9/1998 | Azuma | |
| 5,915,514 | A | 6/1999 | Nojiri et al. | |
| 6,871,735 | B2 | 3/2005 | Kawai et al. | |
| 6,974,010 | B2 * | 12/2005 | Machida et al. | 192/17 D |

FOREIGN PATENT DOCUMENTS

| | | | |
|---|---|---|---|
| DE | 94 09 014 | U1 | 11/1995 |
| DE | 196 07 552 | B4 | 9/1996 |
| DE | 195 81 600 | C2 | 3/1997 |
| DE | 103 12 499 | A1 | 9/2004 |
| DE | 10 2005 012 938 | A1 | 9/2006 |
| GB | 2135754 | * | 9/1984 |
| WO | WO 2007014686 | A1 * | 2/2007 |

OTHER PUBLICATIONS

Partial English translation of DE 94 09 014 U1, previously filed Jan. 8, 2008.

* cited by examiner

*Primary Examiner* — David D Le
*Assistant Examiner* — Ryan Dodd
(74) *Attorney, Agent, or Firm* — Christie, Parker & Hale, LLP

(57) ABSTRACT

A drive device with override function for a moving device in motor vehicles includes a drive element, an output element with a rotationally symmetrical surface connected to the moving device, and a connecting device, which under a drive-side load transmits a drive torque to the output element and in the absence of the drive-side load releases the output element. The drive device further includes a carrier wrap spring, which is operatively connected to the drive element and can be brought into engagement with the rotationally symmetrical surface of the output element, together with a control element, which under a drive-side load braces the carrier wrap spring with the rotationally symmetrical surface of the output element and in the absence of the drive-side load releases the bracing of the carrier element with the rotationally symmetrical surface of the output element.

7 Claims, 6 Drawing Sheets

DRIVE DEVICE WITH OVERRIDE FUNCTION

CROSS-REFERENCE TO A RELATED APPLICATION

This application claim priority to and benefit of German Patent Application No. 10 2006 052 200.1, filed on Oct. 31, 2006.

BACKGROUND

The invention relates to a drive device with override function for a moving device in motor vehicles.

For opening and closing motor vehicle doors, tailgates, sliding roofs and the like, electric motor drive devices are used, which after operation of a switch device perform the opening and closing sequence without the need for any manual operation. Since, with electric motor actuation of the moving device, the opening and closing speed is limited, among other things for safety reasons, users tend to speed up the opening and closing sequence through additional manual operation, which can cause damage to the electric motor drive device. Since a manual opening and closing of the moving device moreover has to be ensured in the event of a failure of the electric motor drive device, a connecting device, which under a drive-side load transmits the drive torque to the output element and in the absence of the drive-side load releases the output element, so that the output element is isolated from the drive element, if the electric motor drive device fails or the user seeks to operate the moving device manually whilst the electric motor drive is switched off, is inserted into the connection between a drive element driven by electric motor and an output element connected to the moving device.

SUMMARY

The object of the present invention is to create a drive device with override function for moving devices in motor vehicles, which whilst being highly reliable and durable is space-saving, easy to operate and easily adjustable with regard to its power transmission and override function.

An exemplary solution according to an exemplary embodiment of the invention provides a drive device with override function for a moving device in motor vehicles, the distinguishing features of which are that it is highly reliable and durable, of simple, compact construction and easy to manufacture and operate, whilst being easily adjustable with regard to its power transmission and override function.

The simple construction and high reliability are assured by the use of components which have proven successful in manually operated moving devices in motor vehicles, such as seat adjustments, backrest adjustments and the like, and are easy to manufacture, process and adjust and afford an outstanding service life. Since the interaction between these components in corresponding drive devices can be determined from simple mechanical parameters, it is possible to calculate and adjust the power transmission and override function precisely. The use of these components furthermore makes it possible to construct a compact drive device, so that a drive device of this type with override function can readily be integrated into a motor vehicle body even with the small amount of space available there.

The flexible carrier element preferably comprises a carrier wrap spring (or a spring strip) with angled spring arms, which under a drive-side load are operatively connected to the drive element and to the control element, in such a way that the carrier wrap spring is braced with the rotationally symmetrical, especially cylindrical surface of the output element.

The use of a wrap spring or a spring strip with angled spring arms as flexible carrier element makes it possible, by defining a wrap angle of the wrap spring or the spring strip around the rotationally symmetrical surface of the output element and by defining or allowing for the coefficient of friction between the wrap spring or spring strip and the rotationally symmetrical surface of the output element, to determine the level of the torque to be transmitted and to match this to the torque of the electric motor drive device. The wrap spring or spring strip can furthermore be designed so that in the absence of the drive-side load the wrap spring or the spring strip rubs substantially free of friction on the rotationally symmetrical surface of the output element or is even spaced at an interval from the latter, so that a manual operation of the moving device coupled to the output element is ensured substantially without any opposing friction forces.

In the absence of drive-side load, the carrier wrap spring bears with little friction against the output element or is spaced at an interval from the output element, so that in the event of a manual operation of the moving device the output element connected to the moving device can rotate freely or with minimal friction, without carrying other functional elements of the drive device with override function along with it.

The solution according to the invention permits several design variants with different components for achieving the power transmission and override function.

In a first exemplary embodiment of the solution according to the invention the control element comprises a cylindrical viscous coupling with an outer cylinder fixedly supported on the rotationally symmetrical housing, an inner cylinder and a fluid between the outer and inner cylinder, which has stops assigned to the angled spring arms of the carrier wrap spring, against each of which one of the two angled spring arms of the carrier wrap spring rests when the drive side is under load.

Viscous couplings are used in drivetrains of motor vehicles and by way of a circular disk, a cylinder or a plate internally transmit a rotational movement on the input side to a fluid, which in turn drives a further plate on the output side. This design enables viscous couplings to transmit a torque and allows a speed compensation, so that as the speed differential between the input side and the output side increases, there is an increase in the torque transmissible by the viscous coupling. These characteristics of a viscous coupling make them suitable for use as control element in a drive device with override function for moving devices in motor vehicles, an outer cylinder being fixedly supported by connection to the housing, for example, whilst an inner cylinder, by way of staggered stops, interacts with the carrier element, so that when the drive side is under load the viscous coupling exerts an opposing force on the flexible drive element, which in conjunction with the drive force exerted on the carrier element by the drive element causes a contraction of the flexible carrier element on the rotationally symmetrical surface of the output element and thereby allows the force or torque to be transmitted from the drive element to the output element.

The carrier wrap spring exemplary bears under pre-tensioning against the inner cylinder of the viscous coupling and is spaced at a slight interval from the output element, so that the override function of the drive device is always activated and that a certain counter-torque, which ensures that the carrier wrap spring bears on the output element, is generated only when there is a load on the drive side and the viscous coupling is rotating.

Since in this exemplary embodiment of the solution according to the invention the maximum torque that the carrier element is capable of transmitting to the output element is limited by the speed-dependent counter-torque generated by the viscous coupling, with due allowance for the coefficient of friction and the wrap angle of the carrier wrap spring or spring strip about the rotationally symmetrical surface of the output element, larger torques can be obtained only by increasing the wrap angle or by more turns of a wrap spring, a greater resistance of the viscous coupling, or by higher coefficients of friction, which incurs a corresponding additional cost.

In order to be able to transmit even larger torques from the drive element to the output element, and to obtain an automatically intensifying effect in the torque transmission, an intensifier lever, the force introduction points of which on the drive element are situated between the angled spring arms of the carrier wrap spring and the axis of rotation of the drive device, and which acts to brace the carrier wrap spring with the output element when a drive-side load acts on both angled spring arms of the carrier wrap spring, is arranged between the angled spring arms and the drive element.

In this exemplary embodiment the opposing force or counter-torque, required for contraction of the flexible carrier element or the wrap spring (or the spring strip) on the rotationally symmetrical surface of the output element, varies as a function of the torque exerted by the viscous coupling. The force-intensifying effect of the intensifier lever inserted into the power flow of the drive device results from the disposition of the force-transmitting contact points on the drive element at so-called force introduction points, which are disposed between the connection of the intensifier lever to the angled spring arms of the wrap spring or spring strip and the axis of rotation of the drive device.

By way of the intensifier lever, a force varying as a function of the force transmission points, which are formed by the contact points between the intensifier lever and the drive element, thereby acts on the carrier element. The location of the force, which depends upon the always unequal lever arms into which the intensifier lever is divided when a load is applied on both sides of the force transmission points, ensures correspondingly unequal but unidirectional loads on the angled spring arms of the carrier element, so that a component force bracing the carrier element with the rotationally symmetrical surface always acts on both angled spring arms of the carrier element and ensures a secure connection between the carrier element and the rotationally symmetrical surface of the output element.

The reason for this lies in the automatically intensifying effect of this arrangement, since as the force acting on the intensifier lever increases, the forces transmitted to the angled spring arms of the carrier element and bracing the carrier element with the rotationally symmetrical surface of the output element also increase.

In the exemplary embodiment with intensifier lever the drive element preferably comprises a two-armed rocker lever, which is capable of pivoting about the axis of rotation and the end-side cams of which are situated opposite stop faces of the intensifier lever.

In an alternative exemplary embodiment of the invention, instead of a viscous coupling, a pre-tensioned control wrap spring, fixed to the housing, and a transmission lever arranged between the drive element, the flexible carrier element and the control wrap spring, are used as control element, the transmission lever bracing the flexible carrier element with the rotationally symmetrical surface of the output element when the drive side is under load, and canceling the bracing of the control wrap spring with the rotationally symmetrical housing.

Under a drive-side load, the two-armed rocker lever, capable of pivoting about the axis of rotation, bears against the transmission lever with one of its two cams, depending on the direction of rotation, and turns idly with the transmission lever and the carrier wrap spring for a small distance until the transmission lever encounters the control wrap spring. Because the control wrap spring is inserted into the rotationally symmetrical housing under pre-tension, causing the control wrap spring to generate a frictional moment, the idle turning of the transmission lever with the carrier wrap spring is interrupted. As the rocker lever continues to turn, the transmission lever tilts about the contact with the control wrap spring and tightens the carrier wrap spring on the rotationally symmetrical surface of the output element, so that the relative movement between the carrier wrap spring and the output element is interrupted. The transmission lever, the output element, the carrier wrap spring and the control wrap spring now rotate together with the rocker lever about the drive axis.

Since in this exemplary embodiment the control wrap spring is made to turn about the drive axis together with the transmission lever, the output element and the flexible carrier element, and in so doing rubs against the rotationally symmetrical housing, a certain loss occurs due to friction, which in a development of the solution according to the invention can be avoided in that switch members are arranged between the transmission lever and the flexible carrier element, which under a drive-side load exert a force counter to the transmission of force from the transmission lever to the carrier element until the bracing of the control wrap spring with the rotationally symmetrical housing is canceled, and which in the absence of the drive-side load return the drive element to its starting position via the operative connection between the transmission lever and the drive element.

In this exemplary embodiment, as the output torque and hence the drive torque increase, the switch members cause the transmission lever, under a specific force predetermined by the switch members, to lift the control wrap spring off from the rotationally symmetrical housing, so that the control wrap spring no longer rubs on the rotationally symmetrical housing in order to transmit the torque from the drive element to the output element. This makes it possible to minimize the force needed for adjustment of the moving device, such as a vehicle door, driven by the drive device. In addition, rubbing noises of a control wrap spring against a rotationally symmetrical housing are avoided.

In addition, in the absence of the drive-side load and without drive-side self-locking, the switch members cause the drive to be returned to the starting position. With drive-side self-locking a brief manual rotation of the output is sufficient to cancel the bracing of the working elements and to return them to their starting position.

The control wrap spring exemplary has spring arms angled at the ends and the transmission lever has multiple contact faces, of which first contact faces are situated opposite the drive element, second contact faces opposite one side of the angled spring arms of the flexible carrier element, third contact faces opposite the other side of the angled spring arms of the flexible carrier element and fourth contact faces opposite the angled spring arms of the control wrap spring, on the side which under load lead to a contraction and release of the control wrap spring, inserted into the rotationally symmetrical housing under pre-tension.

The switch members consist, in particular, of compression springs, which are arranged between the third contact faces of the intensifier lever and the angled spring arms of the flexible carrier element.

In this exemplary embodiment the drive element is likewise embodied as a two-armed rocker lever capable of pivoting about a drive axis, which is arranged in a recess in the intensifier lever and the ends of which are situated opposite the first contact faces of the intensifier lever, whilst a projection of the rocker lever, with one radial contact face, runs at a slight interval from the control wrap spring, so that the control wrap spring can be drawn towards the projection for the purpose of contraction.

BRIEF DESCRIPTION OF THE DRAWINGS

The working principle of the invention and derived embodiments thereof will be explained with reference to a number of exemplary embodiments represented in the figures, in which.

DETAILED DESCRIPTION

Figure 1:
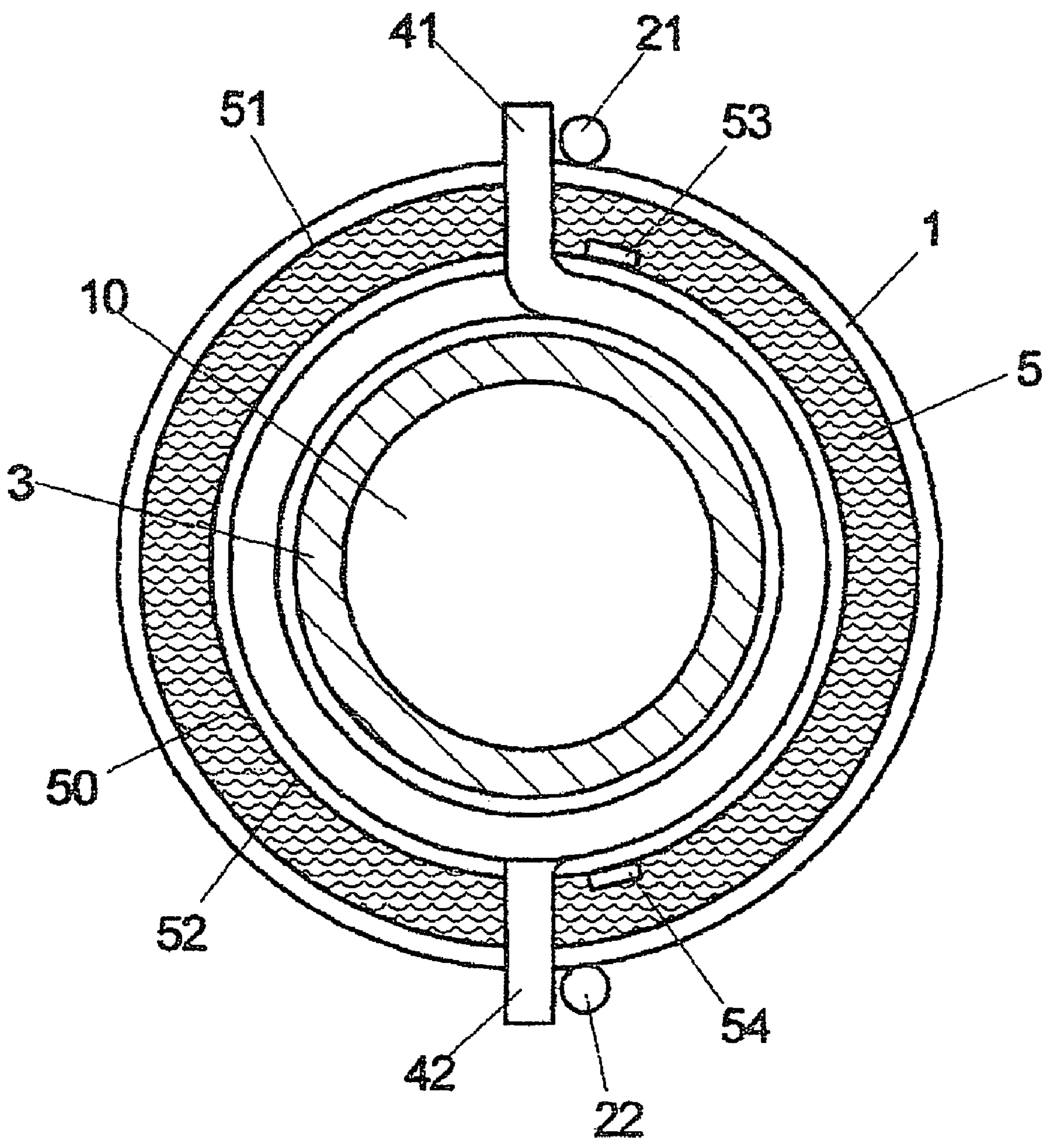
FIG. 1 shows a schematic cross section through a drive device having a viscous coupling as control element for the override function of the drive device.

FIG. 1 shows a schematic cross section through a drive device with override function for a moving device in motor vehicles, for example for adjusting a tailgate, a vehicle door or the like, which can be operated manually or by an electric motor. The drive device has a rotationally symmetrical housing 1, with drive claws 21, 22 connected to an electric motor drive, a viscous coupling 5 inserted into the rotationally symmetrical housing 1, a flexible carrier element 4 which is inserted into the viscous coupling 5 and which is arranged around an output element 3, and a drive axis 10. The viscous coupling 5 comprises an outer cylinder 51, fixed to the rotationally symmetrical housing 1, and an inner cylinder 52, between which there is a fluid 50. Two stops 53, 54 on the inner cylinder 52 of the viscous coupling 5 correlate with angled spring arms 41, 42 of the flexible carrier element 4 embodied as a carrier wrap spring.

The carrier wrap spring 4 is inserted into the inner cylinder 52 of the viscous coupling 51 under pre-tension and is situated at a slight interval from the output element 3. Since the viscous coupling 5 has virtually no frictional moment when stationary, when the electric motor drive is not actuated, that is to say in the absence of a load on the drive side, the carrier wrap spring 4 is capable at any time of bearing under pre-tension against the inner cylinder 52 of the viscous coupling 5 and turning the inner cylinder 52 of the viscous coupling 5, so that the override function of the drive device is ensured in the non-powered state.

On actuation of the electric motor drive, the drive claws 21, 22 are turned in the respective direction of rotation of the electric motor drive about the drive axis 10, so that one or the other drive claw 21, 22 bears on its associated, angled spring arm 41, 42 of the carrier wrap spring 4 and carries the carrier wrap spring 4 with it in the relevant direction of rotation, whilst the other angled spring arm 41 or 42, after a short adjustment travel, strikes against its associated stop 53 or 54 on the inner cylinder 52 of the viscous coupling 5. The inner cylinder 52 of the viscous coupling 5 is thereby rotated relative to the fixedly supported outer cylinder 51, so that owing to the characteristics of the viscous coupling 5 the torque produced by the viscous coupling 5 increases and thereby generates a counter-torque in opposition to the drive device of the electric motor drive on the relevant stop 53 or 54 of the inner cylinder 52.

The drive torque acting on the one angled spring arm 41 or 42 of the carrier wrap spring 4 by way of the relevant drive claw 21 or 22, and the counter-torque acting on the other angled spring arm 41 or 42 via the associated stop 53, 54 on the inner cylinder 52 of the viscous coupling 5 lead to a contraction of the carrier wrap spring 4 on the rotationally symmetrical surface of the output element 3, so that the carrier wrap spring 4 is braced non-positively or frictionally with the output element 3, thereby transmitting the drive torque delivered by the electric motor drive to the output element 3, which together with the carrier wrap spring 4 and the inner cylinder 52 of the viscous coupling 5 rotates in the respective drive device and thereby operates the moving device in one or the other adjustment direction.

If the electric motor drive is switched off, so that the drive claw 21 or 22 acting in the relevant direction of rotation of the electric motor drive can no longer exert a drive torque on its associated angled spring arm 41 or 42 of the carrier wrap spring 4, the carrier wrap spring 4 opens and the frictional connection between the carrier wrap spring 4 and the rotationally symmetrical surface of the output element 3 is neutralized, so that the output element 3 can move freely again.

The counterforce of the angled spring arm 41 or 42 needed for the counter-torque can be kept small depending on the number of turns of the carrier wrap spring 4 around the rotationally symmetrical surface of the output element 3.

Since the counter-torque generated by the viscous coupling 5 increases with a growing speed differential between the outer cylinder 51 fixed to the housing and the inner cylinder 52 of the viscous coupling 5 moved by way of the carrier wrap spring 4 and the stops 53, 54, the transmission of drive-side torque to the output element 3 can be controlled via the speed of the electric motor drive.

A distinctive feature of the drive device with override function represented in FIG. 1 is its very simple construction, in which the torque transmission under a drive-side load and the override function for manual operation of the moving device is produced by the carrier wrap spring 4, in conjunction with the viscous coupling 5 as control element for detecting a drive-side load and relaying the drive torque to the output element 3.

In this embodiment of the invention the viscous coupling 5 acts as control element, which "senses" a drive-side load and relays the drive torque to the output element 3 by generating a counter-torque. Here the maximum torque $M_{max}$ that can be transmitted from the drive element to the output element varies as a function of the counter-torque $M_V$ generated by the viscous coupling, the coefficient of friction $\mu$ between the carrier wrap spring 4 and the rotationally symmetrical surface of the output element 3, and the wrap angle $\alpha$ of the carrier wrap spring 4 about the rotationally symmetrical surface of the output element 3, according to the correlation:

$$M_{max}=M_V\cdot e^{\mu\alpha}$$

The torque that can be transmitted to the output element 3 by the drive claws 21, 22 can therefore be increased by increasing the number of turns of the carrier wrap spring 4 around the rotationally symmetrical surface of the output element 3, a higher coefficient of friction between the carrier wrap spring and the rotationally symmetrical surface of the output element 3, and a higher visco-resistance of the viscous coupling 5. These possible ways of increasing the torque that the electric motor drive is capable of transmitting to the output element 3 are often restricted, however, by the specified maximum design size of the drive device, by the materials used for the working elements and by the production costs, in particular by the choice of viscous coupling 5. In order nevertheless to be able to transmit large torques, the embodiment of the invention represented in FIG. 1 is modified as shown in FIG. 2.

Figure 2:
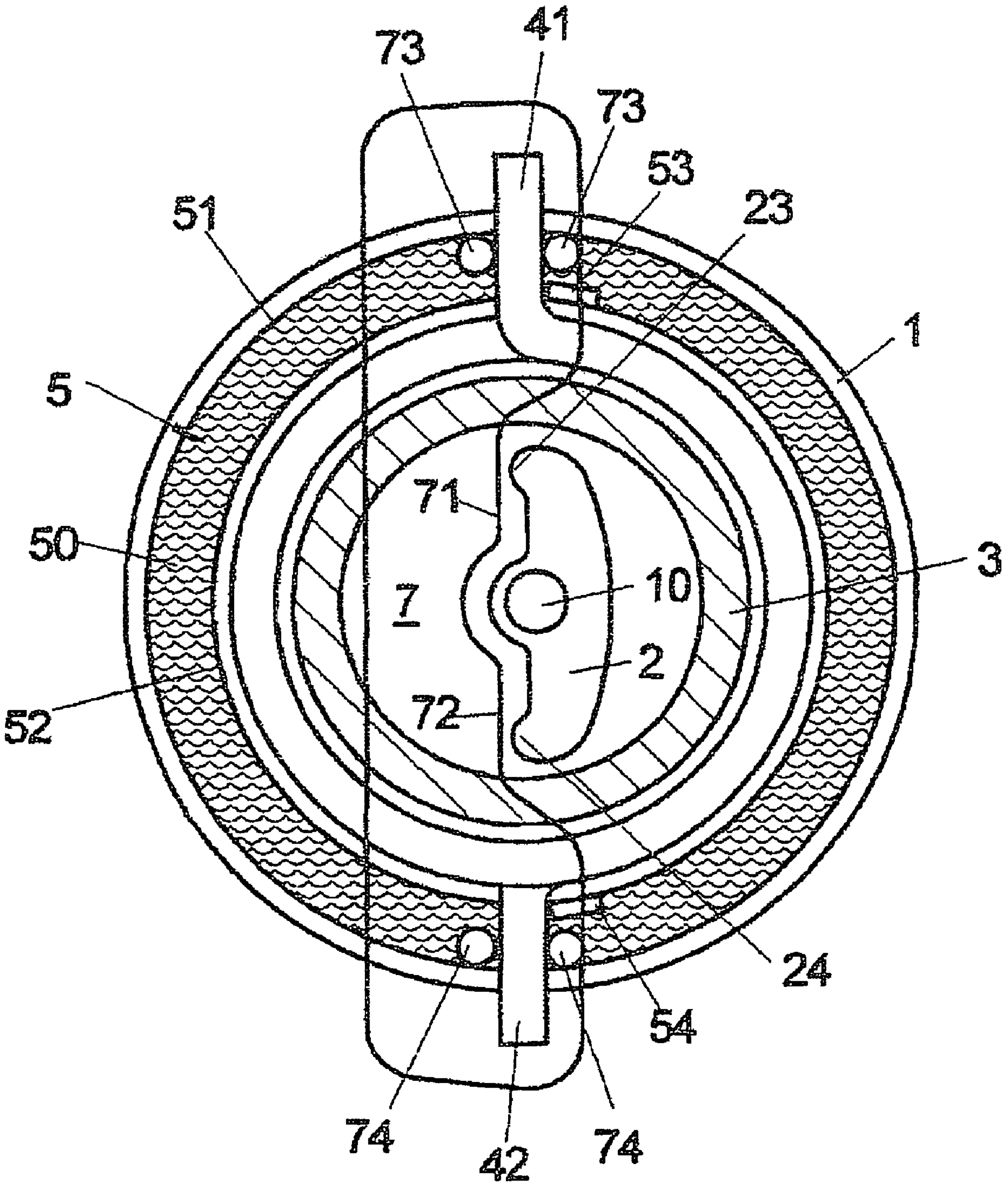
FIG. 2 shows a schematic cross section through a drive device according to FIG. 1 having an additional intensifier lever.

In the embodiment according to FIG. 2 the drive claws 21, 22 according to FIG. 1 have been replaced by a rocker lever 2, which is connected to the electric motor drive so that it can rotate about the drive axis and has two end cams 23, 24, which interact with stop faces 71, 72 of a floating intensifier lever 7, which is aligned parallel to the rocker lever 2 and with carrier pins 73, 74 bears against the angled spring arms 41, 42 of the carrier wrap spring 4 on both sides. The stop faces 71, 72 of the intensifier lever 7 form the force introduction points for the drive force or the drive-side torque when the electric motor drive is actuated and lie between the angled spring arms 41, 42 of the carrier wrap spring 4 and the drive axis 10. Under a drive-side load they act on both angled spring arms 41, 42 of the carrier wrap spring 4 so as to brace the carrier wrap spring 4 with the rotationally symmetrical surface of the output element 3.

The remainder of the construction of the embodiment of the inventive drive device with override function represented in schematic cross section in FIG. 2 corresponds to the construction of a drive device with override function represented in FIG. 1 and described above.

When the electric motor drive is not actuated, the rocker lever 2 does not exert any drive torque on the intensifier lever 7 and hence on the angled spring arms 41,42 of the carrier wrap spring 4, so that the carrier wrap spring 4 is opened and the output element 3 can move freely.

If the electric motor drive is actuated in one or the other direction of rotation, one or the other cam 23, 24 of the rocker lever 2, according to the respective direction of rotation, presses against its associated stop face 71, 72 on the intensifier lever 7, which carries with it, in the relevant direction of rotation, that angled spring arm 41 or 42 of the carrier wrap spring 4 which is adjacent to the drive axis 10 of the respective stop face 71, 72 of the intensifier lever 7, whilst the other angled spring arm 41 or 42 is pressed against its associated stop 53 or 54 of the inner cylinder 52 of the viscous coupling 5, so that the viscous coupling 5, through a counterforce, prevents the carrier wrap spring 4 from turning freely.

Due to the drive force acting on the one angled spring arm 41 or 42 of the carrier wrap spring 4 and the counterforce acting on the other angled spring arm 41 or 42 of the carrier wrap spring 4, the carrier wrap spring 4 is made to contract on the rotationally symmetrical surface of the output element 3 and forms a frictional connection with the output element 3.

From this state onwards the intensifying effect of the intensifier lever 7 comes into play, so that the counterforce or counter-torque required for contraction of the carrier wrap spring 4 on the rotationally symmetrical surface of the output element 3 becomes independent of the torque exerted by the viscous coupling 5. The intensifying effect of the intensifier lever 7 introduced into the power flow of the drive device here results from the disposition of the force-transmitting contact points 71, 72 of the intensifier lever 7 with the rocker lever 2, or from the force introduction points disposed in the connection of the intensifier lever 7 to the angled spring arms 41, 42 of the carrier wrap spring 4 and the drive axis 10 of the drive device. A force varying as a function of these force transmission points 71, 72 is thereby applied to the carrier wrap spring 4 via the intensifier lever 7. The location of the force, which depends upon the unequal lever arms into which the intensifier arm 7 is divided when a load is applied on both sides of the force transmission points 71, 72, ensures correspondingly unequal but unidirectional loads on the angled spring arms 41, 42 of the carrier wrap spring 4, so that a component force bracing the carrier wrap spring 4 with the rotationally symmetrical surface of the output element 3 always acts on both angled spring arms 41, 42 of the carrier wrap spring 4 and ensures a secure connection between the carrier wrap spring 4 and the rotationally symmetrical surface of the output element 3.

The reason for the bracing component force lies in the automatically intensifying effect of the arrangement of the intensifier lever 7, since as the force acting on the intensifier lever 7 increases the forces transmitted to the angled spring arms 41, 42 of the carrier wrap spring 4 and bracing the carrier wrap spring 4 with the rotationally symmetrical surface of the output element 3 also increase. Due to the unequal length of the lever arms, a small torque will therefore be sufficient to exert the counterforce needed for contraction of the carrier wrap spring 4, since this always contracts even under a small counterforce and therefore prevents the carrier wrap spring 4 slipping on the rotationally symmetrical surface of the output element 3. A very simple viscous coupling, which also only builds up a small torque in the event of speed differentials between the fixedly supported outer cylinder 51 and the inner cylinder 52, can therefore be used as control element.

The embodiment with an intensifier lever represented in FIG. 2 therefore requires only a small force in order to generate the counter-torque, but a large force to drive the drive device. At the same time the transmitted torque is largely independent of the type and design of the viscous coupling 5, of the effective wrap angle α of the carrier wrap spring 4 about the rotationally symmetrical surface of the output element and of the coefficient of friction μ between the carrier wrap spring 4 and the rotationally symmetrical surface of the output element 3, that is to say fewer turns are needed in order to achieve the automatic intensification and the counterforce of the viscous coupling 5 no longer has any impact on the transmissible torque.

Figure 3:
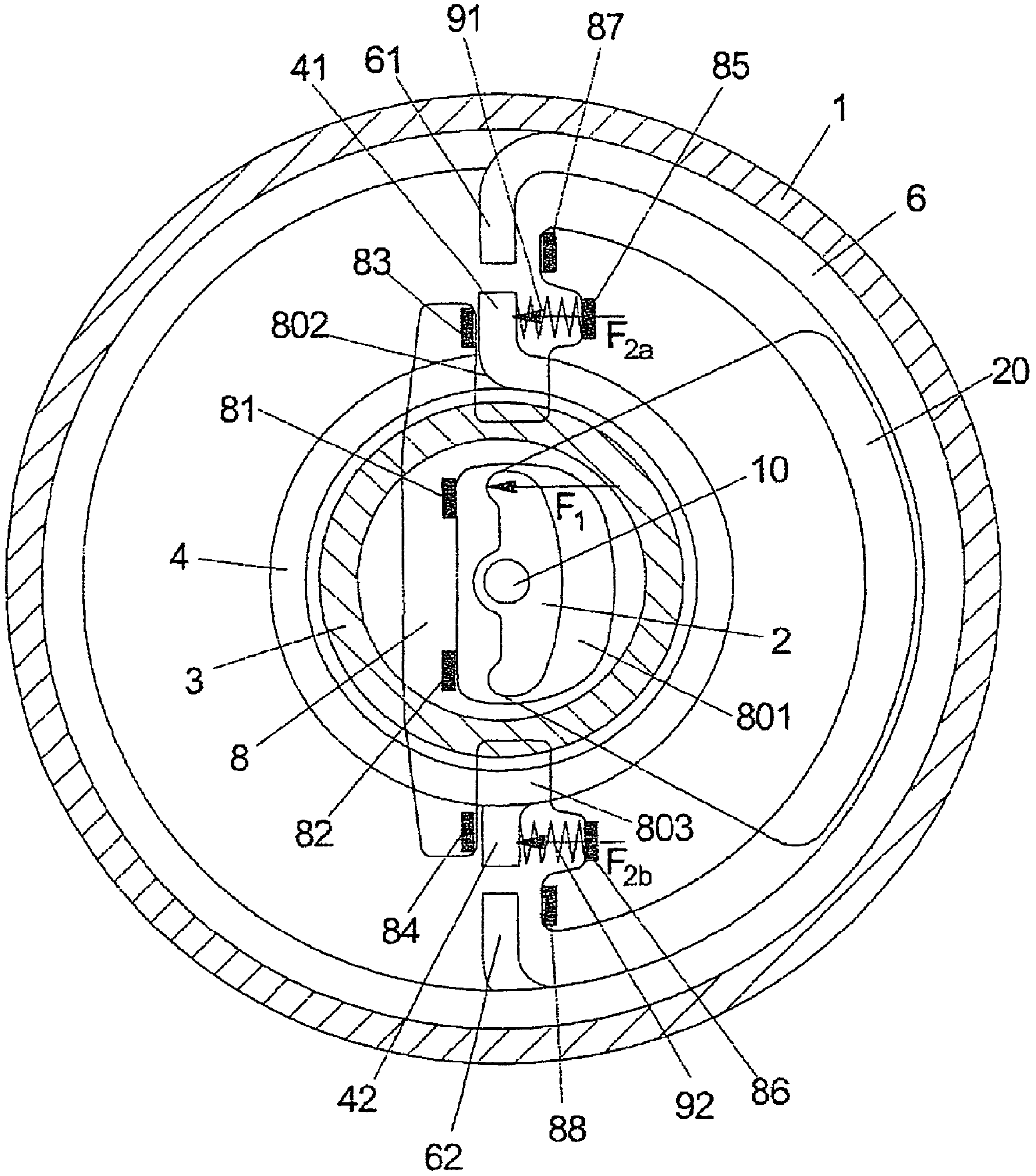
FIG. 3 shows a schematic cross section through a drive device having a control wrap spring, a transmission lever and a switch member as control element, in a state with no load on the drive side.
Figure 4:
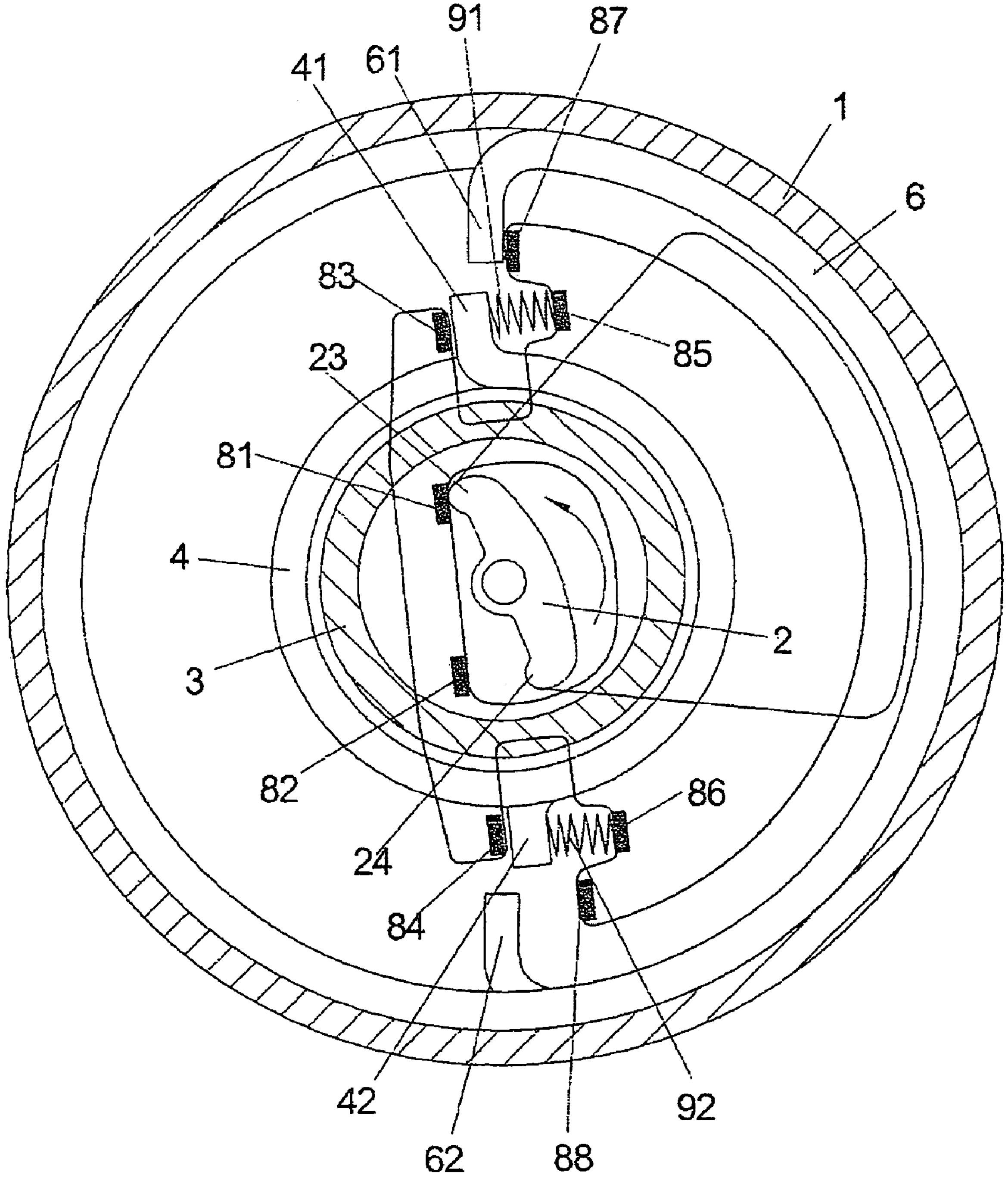
FIG. 4 shows a phase in the movement of working elements of the drive device according to FIG. 3, with a load on the drive side.

Instead of a viscous coupling 5, in the embodiment of the invention according to FIG. 3, a combination of a transmission lever 8 with a control wrap spring 6 and a switch member 91, 92 is used as control element for the transmission of torque from the electric motor drive to the output element 3.

The schematic cross section through a drive device represented in FIG. 3 has a rotationally symmetrical housing 1 and a two-armed rocker lever 2, which is connected to an electric motor drive and which is arranged in a first, central recess 801 of a floating transmission lever 8 running transversely over the drive device, and has end cams 23, 24 situated opposite the first contact faces 81, 82 of the transmission lever 8. A cylindrical output element 3 is surrounded by a carrier wrap spring 4, which has some play relative to the cylindrical output element 3 and has spring arms 41, 42 angled off towards the housing 1 at the ends, which extend into diametrically opposing second and third recesses 802, 803 of the transmission lever 8 and are not rigidly guided but on the one hand bear against second contact faces 83, 84 of the transmission lever 8 and on the other are pre-tensioned by means of two switch members in the form of compression springs 91, 92 against third contact faces 85, 86 of the transmission lever 8.

A control wrap spring 6 inserted under pre-tension into the rotationally symmetrical housing 1 has spring arms 61, 62, angled off at the ends and directed into the interior of the rotationally symmetrical housing 1, opposite which arms fourth contact faces 87, 88 of the transmission lever 8 are situated radially further outwards on the side which, when in contact against the angled spring arms 61, 62, lead to a contraction of the control wrap spring 6 bearing under pre-tension against the rotationally symmetrical housing 1.

The two-armed rocker lever 2 arranged in the first recess 801 in the middle of the transmission lever 8 contains a radial projection 20, which is directed towards the rotationally symmetrical housing 1 and which forms an arched bearing face at a very small interval from the outer control wrap spring 6 seated in the fixed rotationally symmetrical housing 1.

The working principle of the drive device with override function according to FIG. 3 will be explained below in four working states represented in FIGS. 3 to 6.

The play allowed between the carrier wrap spring 4 and the rotationally symmetrical output element 3 means that, under manual operation of the moving device in the configuration shown in FIG. 3, the output element 3 can be turned freely without carrying the other working elements with it.

On actuation of the electric motor drive, causing the electric motor to start up, the rocker lever 2 is moved in the respective direction of rotation of the electric motor drive with the resultant direction of adjustment of the moving device with one of its two cams 23, 24 against its associated first contact face 81, 82 on the transmission lever 8. In a counter-clockwise rotation of the rocker lever 2, for example, as in the schematic representation according to FIG. 4, the upper cam 23 runs into the first contact face 81 of the transmission lever 8.

As the drive rocker lever 2 continues to rotate counter-clockwise, the transmission lever 8 and the carrier wrap spring 4, the angled spring arms 41, 42 of which are held between the second and third contact faces 83, 84; 85, 86 under the pre-tensioning force of the compression springs 91, 92, also rotate for a short travel until the fourth contact face 87 of the transmission lever 8 acting in this direction of rotation runs into the inwardly angled spring arm 61 of the control wrap spring 6.

Because the control wrap spring 6 is inserted into the rotationally symmetrical housing 1 under pre-tension, causing the control wrap spring 6 to generate a frictional moment, the idle turning of the transmission lever 8 with the carrier wrap spring 4 is interrupted. Under a continuing drive-side load, the cam 23 of the rocker lever 2 continues to press against the first contact face 81 of the transmission lever 8, which thereupon according to FIG. 5 tilts about the contact point between the fourth contact face 87 and the angled spring arm 61 of the control wrap spring 6, so that the two outwardly angled spring arms 41, 42 of the carrier wrap spring 4 are moved in the direction of the arrow A entered in FIG. 5. The carrier wrap spring 4 is thereby tightened on the rotationally symmetrical surface of the output element 3, so that the relative movement between the carrier wrap spring 4 and the output element 3 is interrupted.

The transmission lever 8, the output element 3, the carrier wrap spring 4 and the control wrap spring 6 now rotate together with the rocker lever 2 counter-clockwise about the drive axis 10. In so doing the turning of the control wrap spring 6 together with the rocker lever 2 causes a certain friction loss owing to their pre-tensioning in the rotationally symmetrical housing 1.

Figure 5:
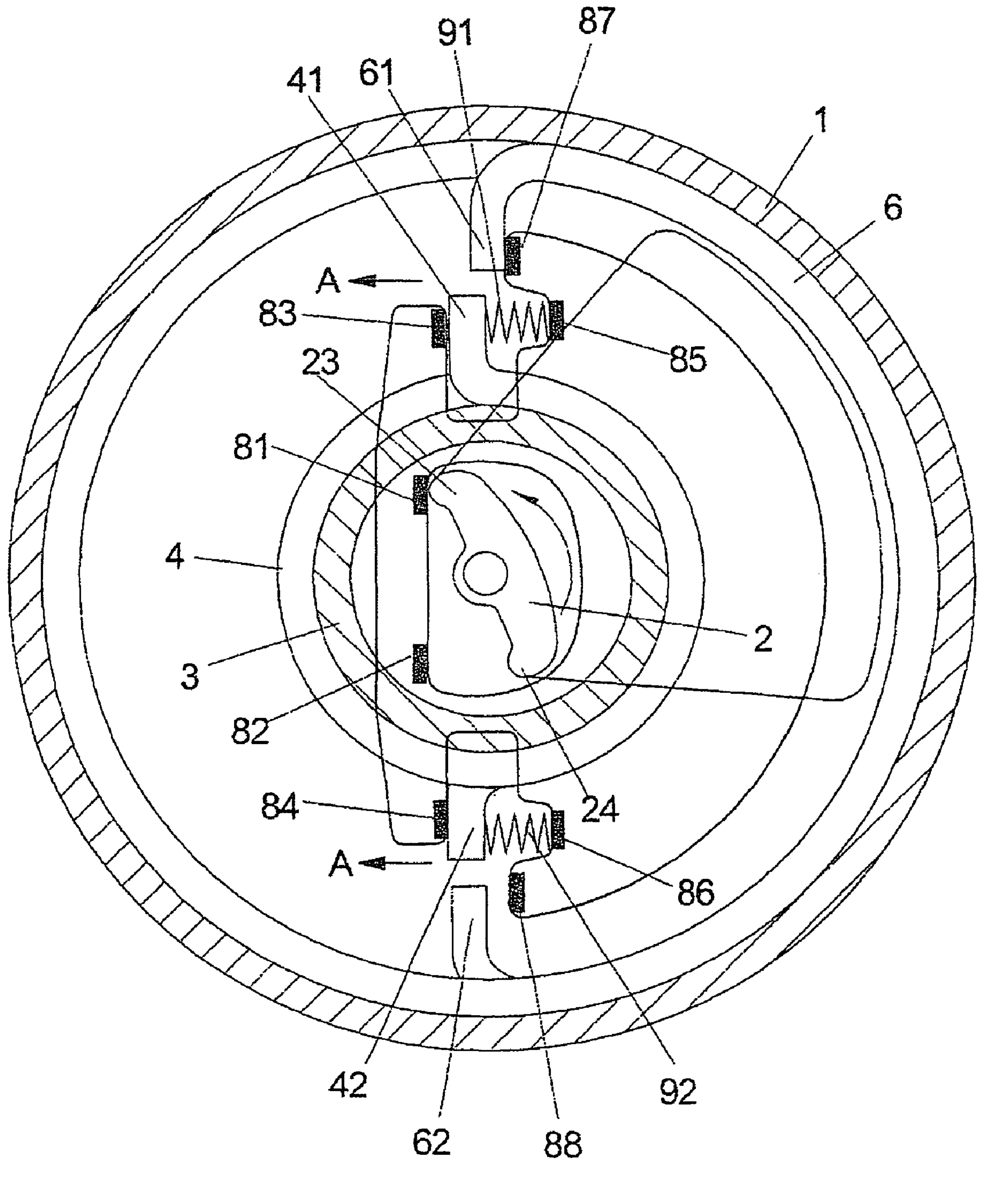
FIG. 5 shows a phase in the movement of working elements of the drive device according to FIG. 3, with a load on the drive side.
Figure 6:
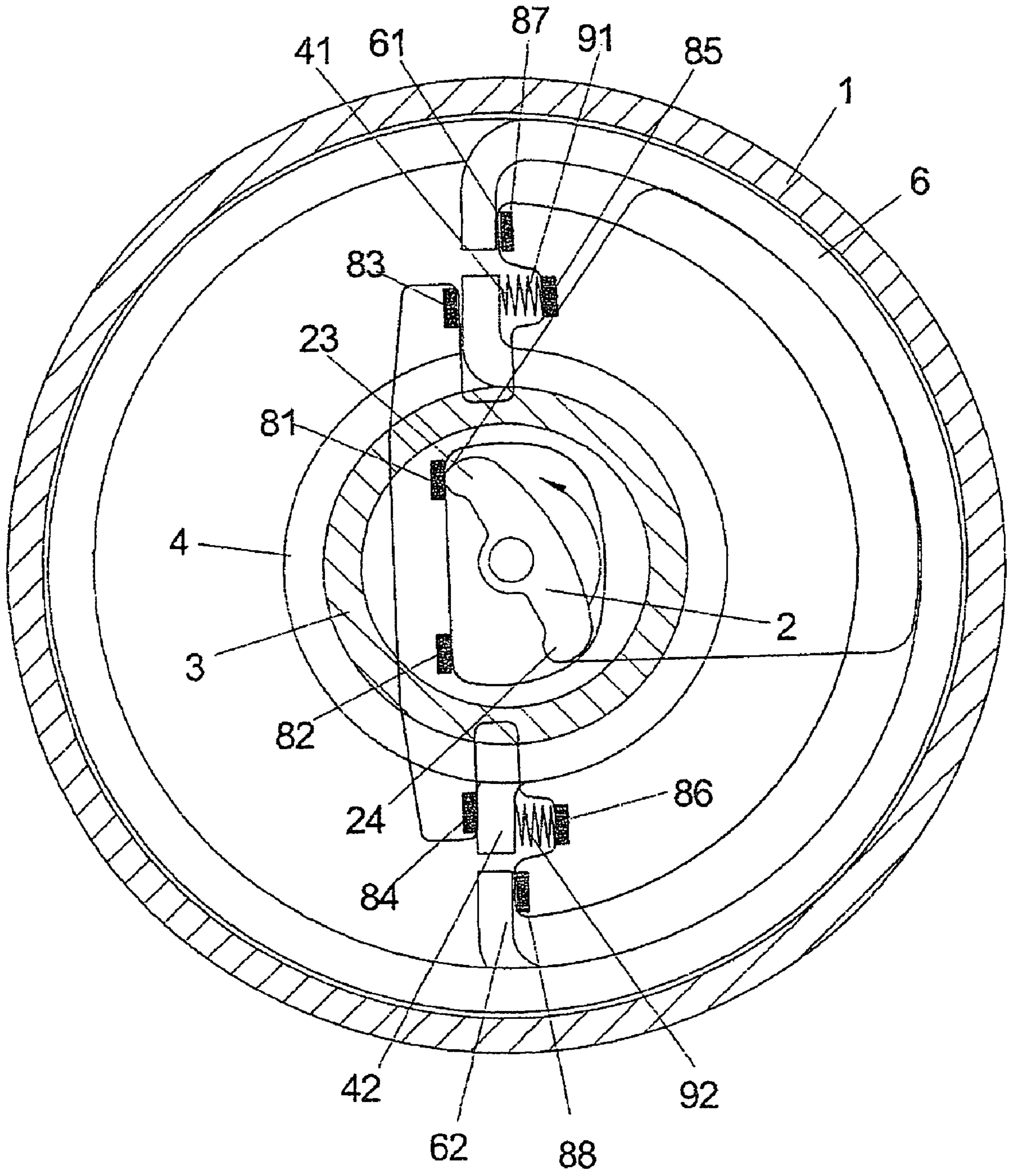
FIG. 6 shows a phase in the movement of working elements of the drive device according to FIG. 3, with a load on the drive side.

If the rocker lever 2 has to work against a larger output torque, owing to an increased friction loss or a greater counterforce of the moving device, the contact pressure force $F_1$ applied to the first contact face 81 by the cam 23 entered in FIG. 3 also becomes greater and the transmission lever 8 is pressed more strongly in the direction of the arrow A according to FIG. 5. From a certain force $F_1$ onwards the transmission lever 8 is deflected against the force $F_{2a}$ and $F_{2b}$ of the pre-tensioned compression springs 91, 92 between the angled spring arms 41, 42 of the carrier wrap spring 4 and the third contact faces 85, 86 of the transmission lever 8, and the two outer contact faces 87, 88 of the transmission lever 8, as shown in FIG. 6, press against the inwardly angled spring arms 61, 62 of the control wrap spring 6 and draw these towards the projection 20 of the drive rocker lever 2, so that the control wrap spring 6 contracts and is lifted off from its pre-tensioned contact against the rotationally symmetrical housing 1. As a result the control wrap spring 6 no longer rubs against the rotationally symmetrical housing 1 as the drive rocker lever 2 rotates, so that in this movement phase no friction losses occur between the control wrap spring 6 and the rotationally symmetrical housing 1.

By matching the spring constants accordingly, the control wrap spring can be released under a small drive force, so that due to the friction between the control wrap spring 6 and the rotationally symmetrical housing 1 only a slight force has to be overcome and an electric motor drive of low power output can consequently be used.

If the electric motor drive is switched off and has no self-locking, the braced compression springs 91, 92 between the angled spring arms 41, 42 of the carrier wrap spring 4 and the third contact faces 85, 86 of the transmission lever 8 provide for resetting of the drive.

With an electric motor drive having self-locking, briefly turning the output element 3 manually further will suffice to release the bracing of the compression springs 91, 92 and to bring about a resetting of the drive.

The invention claimed is:

1. A drive device with override function for a moving device in motor vehicles, the drive device comprising a drive element, an output element with a rotationally symmetrical surface connected to the moving device, and a connecting device, wherein under a drive-side load the connecting device transmits a drive torque to the output element, wherein in the absence of the drive-side load the connecting device releases the output element so that the output element may move freely relative to the drive element and wherein the connecting device comprises a flexible carrier element operatively connected to the drive element and configured to be brought into frictional engagement with the rotationally symmetrical surface of the output element in order to transmit a drive torque to the output element, and wherein the connecting device further comprises a control element, wherein under the drive-side load the control element braces the carrier element with the rotationally symmetrical surface of the output element and in the absence of the drive-side load the control element releases the brace of the carrier element with the rotationally symmetrical surface of the output element, wherein the control element comprises a control wrap spring inserted into a rotationally symmetrical housing under pre-tension, and a transmission lever which is operatively connected to the drive element, the flexible carrier element and the control wrap spring in such a way that the transmission lever releases the brace of the control wrap spring with the rotationally symmetrical housing and braces the flexible carrier element with the rotationally symmetrical surface of the output element in presence of the drive-side load, wherein switch members are arranged between the transmission lever and the flexible carrier element, wherein under a drive-side load, the switch members exert a force counter to a transmission of force from the transmission lever to the flexible carrier element until the bracing of the control wrap spring with the rotationally symmetrical housing is canceled, and wherein in the absence of the drive-side load, the switch members return the drive element to a starting position via an operative connection between the transmission lever and the drive element, wherein the control wrap spring has spring arms angled at ends of the control wrap spring and the transmission lever has multiple contact faces, wherein first contact faces of the multiple contact faces are situated opposite the drive element, second contact faces of the multiple contact faces are situated opposite one side of the angled spring arms of the flexible carrier element, third contact faces of the multiple contact faces are situated opposite the other side of the angled spring arms of the flexible carrier element and fourth contact faces of the multiple contact faces are situated opposite the angled spring arms of the control wrap spring on a side that under load lead to a contraction and release of the control wrap spring inserted into the rotationally symmetrical housing under pre-tension, and wherein the switch members consist of compression springs arranged between the third contact faces of the transmission lever and the angled spring arms of the flexible carrier element.

2. The drive device of claim 1, wherein the flexible carrier element comprises a carrier wrap spring with angled spring arms, wherein under the drive-side load the spring arms are operatively connected to the drive element and to the control element in such a way that the carrier wrap spring is braced with the rotationally symmetrical surface of the output element.

3. The drive device of claim 2, wherein in the absence of the drive-side load, the carrier wrap spring bears with little friction against the output element or is spaced at an interval from the output element.

4. The drive device of claim 2, wherein the carrier wrap spring, under the drive-side load, contracts and engages the rotationally symmetrical surface of the output element.

5. The drive device of claim 1, wherein the transmission lever is configured to act on two outwardly angled spring arms of the carrier wrap spring and, under a continuing drive-side load, is configured to move the two outwardly angled spring aims transversely to the axis of the drive element.

6. A drive device with override function for a moving device in motor vehicles, the drive device comprising a drive element, an output element with a rotationally symmetrical surface connected to the moving device, and a connecting device, wherein under a drive-side load the connecting device transmits a drive torque to the output element, wherein in the absence of the drive-side load the connecting device releases the output element so that the output element may move freely relative to the drive element and wherein the connecting device comprises a flexible carrier element operatively connected to the drive element and configured to be brought into frictional engagement with the rotationally symmetrical surface of the output element in order to transmit a drive torque to the output element, and wherein the connecting device further comprises a control element, wherein under the drive-side load the control element braces the carrier element with the rotationally symmetrical surface of the output element and in the absence of the drive-side load the control element releases the brace of the carrier element with the rotationally symmetrical surface of the output element, wherein the control element comprises a control wrap spring inserted into a rotationally symmetrical housing under pre-tension, and a transmission lever which is operatively connected to the drive element, the flexible carrier element and the control wrap spring in such a way that the transmission lever releases the brace of the control wrap spring with the rotationally symmetrical housing and braces the flexible carrier element with the rotationally symmetrical surface of the output element in presence of the drive-side load, wherein switch members are arranged between the transmission lever and the flexible carrier element, wherein under a drive-side load, the switch members exert a force counter to a transmission of force from the transmission lever to the flexible carrier element until the bracing of the control wrap spring with the rotationally symmetrical housing is canceled, and wherein in the absence of the drive-side load, the switch members return the drive element to a starting position via an operative connection between the transmission lever and the drive element, wherein the control wrap spring has spring arms angled at ends of the control wrap spring and the transmission lever has multiple contact faces, wherein first contact faces of the multiple contact faces are situated opposite the drive element, second contact faces of the multiple contact faces are situated opposite one side of the angled spring arms of the flexible carrier element, third contact faces of the multiple contact faces are situated opposite the other side of the angled spring arms of the flexible carrier element and fourth contact faces of the multiple contact faces are situated opposite the angled spring arms of the control wrap spring on a side that under load lead to a contraction and release of the control wrap spring inserted into the rotationally symmetrical housing under pre-tension, and, wherein the drive element is configured as a two-armed rocker lever pivotable about a drive axis and arranged in a recess in the transmission lever, and wherein ends of the two-armed rocker lever are situated opposite the first contact faces of the transmission lever, and wherein a projection of the rocker lever, with one radial bearing face, runs at a slight interval from the control wrap spring.

7. The drive device of claim 6, wherein the transmission lever is configured to act on two outwardly angled spring arms of the carrier wrap spring and, under a continuing drive-side load, is configured to move the two outwardly angled spring arms transversely to the axis of the drive element.

* * * * *

UNITED STATES PATENT AND TRADEMARK OFFICE

CERTIFICATE OF CORRECTION

PATENT NO. : 8,286,770 B2
APPLICATION NO. : 11/927561
DATED : October 16, 2012
INVENTOR(S) : Georg Scheck et al.

It is certified that error appears in the above-identified patent and that said Letters Patent is hereby corrected as shown below:

In the Claims

Col. 11, Line 55 Delete “aims”
Insert -- arms --

Signed and Sealed this
Sixth Day of May, 2014

Michelle K. Lee
*Deputy Director of the United States Patent and Trademark Office*